(12) United States Patent
Venkatakrishnan et al.

(10) Patent No.: US 10,496,777 B1
(45) Date of Patent: Dec. 3, 2019

(54) PHYSICAL SYNTHESIS FOR MULTI-DIE INTEGRATED CIRCUIT TECHNOLOGY

(71) Applicant: Xilinx, Inc., San Jose, CA (US)

(72) Inventors: Sreesan Venkatakrishnan, San Jose, CA (US); Zhiyong Wang, Cupertino, CA (US); Sabyasachi Das, San Jose, CA (US)

(73) Assignee: XILINX, INC., San Jose, CA (US)

( * ) Notice: Subject to any disclaimer, the term of this patent is extended or adjusted under 35 U.S.C. 154(b) by 90 days.

(21) Appl. No.: 15/816,935

(22) Filed: Nov. 17, 2017

(51) Int. Cl.
*G06F 17/50* (2006.01)

(52) U.S. Cl.
CPC ...... *G06F 17/5068* (2013.01); *G06F 17/5031* (2013.01); *G06F 2217/02* (2013.01); *G06F 2217/06* (2013.01); *G06F 2217/84* (2013.01)

(58) Field of Classification Search
CPC .......................... G06F 17/5031; G06F 17/5068
USPC ........................................ 716/104, 110, 113
See application file for complete search history.

(56) References Cited

U.S. PATENT DOCUMENTS

| | | | | |
|---|---|---|---|---|
| 4,924,589 A * | 5/1990 | Leedy et al. | ....... | G01R 1/07307 257/E21.526 |
| 5,880,598 A | 3/1999 | Duong | | |
| 7,030,466 B1 * | 4/2006 | Hsuan | ................. | H01L 23/481 257/621 |
| 7,111,268 B1 * | 9/2006 | Anderson et al. | .. | G06F 17/5072 716/113 |
| 7,127,696 B2 * | 10/2006 | Alpert | ................ | G06F 17/505 716/114 |
| 7,146,590 B1 | 12/2006 | Chaudhary | | |
| 7,152,217 B1 | 12/2006 | Srinivasan | | |
| 7,163,842 B2 * | 1/2007 | Karnezos | .............. | H01L 21/563 228/180.22 |
| 7,979,831 B1 | 7/2011 | Srinivasan | | |
| 8,122,420 B1 | 2/2012 | Kannan et al. | | |
| 8,156,456 B1 * | 4/2012 | Rahman et al. | .... | G06F 17/5068 703/16 |
| 8,201,130 B1 | 6/2012 | Kalman et al. | | |
| 8,283,771 B2 * | 10/2012 | Somasekhar | ............ | G11C 5/02 257/691 |
| 8,418,115 B1 * | 4/2013 | Tom et al. | .......... | G06F 17/5072 716/105 |
| 8,458,640 B2 * | 6/2013 | Gao | .................... | G06F 17/5072 716/126 |

(Continued)

OTHER PUBLICATIONS

"Altera Hyper-Pipelining for Stratix 10 Designs," Jun. 2015, <https://www.altera.com/content/dam/altera-www/global/en_US_pdsf/literature/an/an715.pdf>, 29 pg.

(Continued)

*Primary Examiner* — Sun J Lin
(74) *Attorney, Agent, or Firm* — Kevin T. Cuenot

(57) ABSTRACT

Physical synthesis for a circuit design can include determining, using a processor, a candidate net from a circuit design, wherein the candidate net spans a plurality of dies of a multi-die integrated circuit, and modifying, using the processor, the candidate net by performing physical synthesis resulting in a modified candidate net. The physical synthesis includes relocating a driver or a load of the candidate net or replicating the driver of the candidate net. An incremental routing can be performed on the modified candidate net using the processor. Further, the modified candidate net can be selectively committed using the processor based upon a timing analysis.

20 Claims, 12 Drawing Sheets

(56) References Cited

U.S. PATENT DOCUMENTS

| | | | |
|---|---|---|---|
| 8,671,379 B1 | | 3/2014 | Jain et al. |
| 8,886,481 B1 | * | 11/2014 | Rahman et al. ........ H01L 22/14 |
| | | | 702/84 |
| 9,996,652 B2 | * | 6/2018 | Sinnadurai et al. ......................... |
| | | | G06F 17/5081 |
| 2018/0341738 A1 | * | 11/2018 | Kahng et al. ............ G06G 7/48 |

OTHER PUBLICATIONS

"Altera Netlist Optimization and Physical Synthesis," Quartus II Handbook, v. 13.1, vol. 2: Design Implementation and Optimization, Nov. 2013, Chapter 16, <http://www.altera.com/literature/hb/qts/qts_qii52007.pdf>, 20 pg.

"Altera Timing Closure and Optimization," Quartus II Handbook, v. 13.1, vol. 2: Design Implementation and Optimization Nov. 2013, Chapter 12, <http://www.altera.com/literature/hb/qts/qts_qii52007.pdf>, 46 pg.

"Synopsys Synplify Premier, The Ultimate FPGA Implementation Platforrn,The best of both worlds: Productivity & Perfomrance," 2011, <http://www.synopsys.com/Tools/Implementation/FPGAImplementation/Documents/synpremier-brochure.pdf>, 4 pg.

"UltraScale Architecture Configurable Logic Block User Guide," UG574, v1.4, Nov. 24, 2015, <http://www.xilinx.com/support/documentation/user_guides/ug574-ultrascale-eb.pdf>, 60 pg.

Saban, K., "Xilinx Stacked Silicon Interconnect Technology Delivers Breakthrough FPGA Capacity, Bandwidth, and Power Efficiency," Xilinx, White Paper: Virtex-7 FPGAs, WP380, v1.2, Dec. 11, 2012, 10 pg.

* cited by examiner

US 10,496,777 B1

PHYSICAL SYNTHESIS FOR MULTI-DIE INTEGRATED CIRCUIT TECHNOLOGY

TECHNICAL FIELD

This disclosure relates to integrated circuits (ICs) and, more particularly, to physical synthesis for an IC that includes multiple dies.

BACKGROUND

Integrated circuits (ICs) can be implemented to perform a variety of functions. Some ICs can be programmed to perform specified functions. An example of a "programmable IC" is a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Many circuit designs have become so large that the circuit designs are implemented within devices that include a plurality of dies. These devices are referred to as "multi-die ICs". In such devices, two or more of the dies may include programmable circuitry. In effect, these devices include multiple FPGA dies mounted on some type of base or carrier. The device may include other types of dies in addition to, or as alternatives to, those described. The base facilitates connectivity among the dies mounted thereto.

SUMMARY

One or more embodiments are directed to methods for physical synthesis for a circuit design. In one aspect, a method can include determining, using a processor, a candidate net from a circuit design, wherein the candidate net spans a plurality of dies of a multi-die integrated circuit (IC), and modifying, using the processor, the candidate net by relocating a driver or a load of the candidate net or replicating the driver of the candidate net, resulting in a modified candidate net. The method can include performing incremental routing, using the processor, on the modified candidate net and selectively committing, using the processor, the modified candidate net based upon a timing analysis of the modified candidate net.

One or more embodiments are directed to systems for physical synthesis for a circuit design. In one aspect, a system includes a memory configured to store program code and a processor coupled to the memory. The processor, in response to executing the program code, is configured to initiate operations. The operations include determining a candidate net from a circuit design, wherein the candidate net spans a plurality of dies of a multi-die IC, and modifying the candidate net by relocating a driver or a load of the candidate net or replicating the driver of the candidate net, resulting in a modified candidate net. The operations can include performing incremental routing on the modified candidate net and selectively committing the modified candidate net based upon a timing analysis of the modified candidate net.

One or more embodiments are directed to computer program products for physical synthesis for a circuit design. In one aspect, a computer program product includes a computer readable storage medium having program code stored thereon. The program code is executable by a processor to perform operations including determining a candidate net from a circuit design, wherein the candidate net spans a plurality of dies of a multi-die IC, and modifying the candidate net by relocating a driver or a load of the candidate net or replicating the driver of the candidate net, resulting in a modified candidate net. The operations can include performing incremental routing on the modified candidate net and selectively committing the modified candidate net based upon a timing analysis of the modified candidate net.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
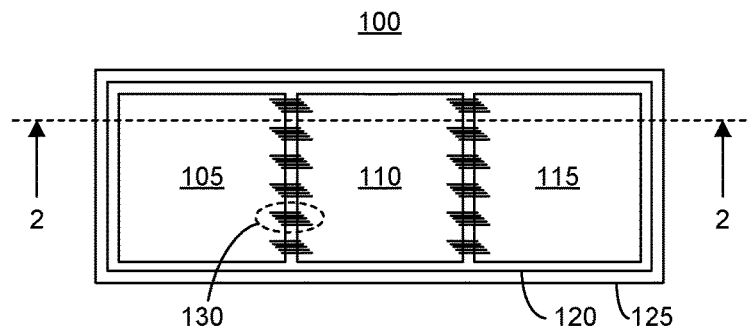
FIG. 1 illustrates an overhead view of an example multi-die integrated circuit (IC).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to physical synthesis for an IC that includes multiple dies. In accordance with the inventive arrangements described within this disclosure, physical synthesis techniques are provided that take into account various factors such as congestion and/or competition for selected resources of a multi-die IC. The physical synthesis techniques further are capable of taking into account routability of the multi-die IC.

In general, physical synthesis refers to a process in which one or more physical transformations, as implemented by an electronic design automation (EDA) system, are performed on a circuit design that has been placed and/or routed. As an illustrative and non-limiting example, the physical transformation(s) include any combination of one or more of netlist changes, placement changes, and/or routing changes. These physical transformations can be applied on the basis of net timing criticality. Further, the physical transformations can be applied to the set of nets that flow from one die of the multi-die IC to another die of the multi-die IC.

In one or more embodiments, the physical synthesis process includes changing the placement of the circuit design after the circuit design has been placed and/or routed. For example, the system is capable of analyzing a circuit design to identify one or more timing critical nets that traverse from one die of the multi-die IC to another die of the multi-die IC. The system analyzes various attributes of the nets. These attributes can include, but are not limited to, fanout and input and/or output delays of drivers and/or loads of the net. The system is capable of determining whether movement of the driver and/or the load(s) of the net to a selected type of site of the multi-die IC improves timing of the net of the circuit design. The site, for example, is one that is dedicated for use with an inter-die wire.

In one or more embodiments, the physical synthesis process includes replication for selected nets. For example, the system is capable of performing replication for those nets considered to be high-fanout nets. The system selects a high-fanout net that includes loads dispersed among more than one die of the multi-die IC. The system is capable of performing a die-aware binning technique for the loads of the selected net. The binning technique first seeks to group loads of the net based upon the particular die in which each load is located. The loads may be further binned based upon other factors such as location within the respective dies. The system is capable of replicating the driver for one or more of the bins. By binning first based upon die, each driver of the net (e.g., referring to both the original driver and any replicated drivers) is located within the same die as the loads being driven by that driver. This serves to reduce timing delays and reduce the number of inter-die connections which reduces competition for inter-die wires.

The physical synthesis techniques described within this specification allow an EDA system to identify issues when implementing a circuit design relating to inter-die connectivity that prevents timing convergence of the circuit design. Through application of the physical synthesis techniques described herein, the EDA system is capable of reducing congestion around die boundaries and reducing the number of inter-die connections. As such, a circuit design that was previously unroutable becomes routable post physical synthesis. Further, by improving routability using the physical synthesis techniques described herein, operation of the EDA system itself is improved. The EDA system is capable of achieving timing convergence for the circuit design in less time than would otherwise be the case. Thus, the EDA system operates faster thereby reducing runtime of the EDA system.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an overhead view of an example multi-die IC 100. In the example of FIG. 1, multi-die IC 100 include dies 105, 110, and 115. Dies 105, 110, and 115 are disposed on a surface, e.g., a top surface or a bottom surface, of an interposer 120. In the example of FIG. 1, dies 105, 110, and 115 are arranged side-by-side on a same surface of interposer 120. Interposer 120 is disposed on a surface of a package substrate 125. In one or more embodiments, dies 105, 110, and 115 are in direct physical contact with interposer 120. In particular embodiments, dies 105, 110, and 115 are coupled to interposer 120 through one or more intervening IC process layers that can include one or more circuit structures.

Each of dies 105, 110, and 115 is capable of implementing any of a variety of different types of circuits or chips. In one or more embodiments, dies 105, 110, and 115 are implemented as programmable ICs. For example, each of dies 105, 110, and 115 is implemented as a field programmable gate array (FPGA). In one or more other embodiments, one or more of dies 105, 110, and 115 may be implemented as another type of IC. As illustrative and non-limiting examples, one or more of dies 105, 110, and 115 can be implemented as a memory, a processor, a programmable IC, a mixed signal IC, or any combination of such circuits.

Interposer 120 is capable of communicatively linking dies 105, 110, and 115 by coupling selected pads of die 105 with selected pads of die 110 and by coupling selected pads of die 110 with selected pads of die 115. A connection between two different dies, e.g., between die 105 and 110 and/or between die 110 and die 115, as facilitated and/or implemented using interposer 120, is referred to as an "inter-die connection". An inter-die connection refers to a signal path that begins in a first die and ends in a second and different die by traversing, at least in part, through interposer 120 using an inter-die wire 130 implemented within interposer 120. For purposes of illustration, inter-die wires 130 are illustrated in an X-Ray type of view. It should be appreciated that in a typical overhead view, inter-die wires 130 are not visible as such wires are disposed within one or more process layers, e.g., patterned metal layers, within interposer 120.

For purposes of illustration, only three dies are shown in FIG. 1. The embodiments described within this specification are not intended to be limited by the number of dies shown in FIG. 1. For example, fewer than three dies or more than three dies may be coupled to interposer 120.

Figure 2:
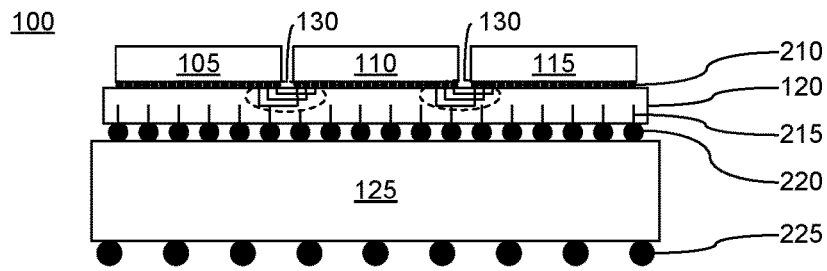
FIG. 2 is a cross-sectional side view of the multi-die IC of FIG. 1.

FIG. 2 is a cross-sectional side view of multi-die IC 100 of FIG. 1. FIG. 2 illustrates multi-die IC 100 of FIG. 1 in cross-section taken along cut-line 2-2 of FIG. 1. Interposer 120 can be implemented as a die formed of one or more layers of an IC process technique. Interposer 120 includes one or more metallization layers, where consecutive metallization layers are separated by an appropriate insulating or non-conductive layer. Each of the metallization layers may be implemented as a patterned metal layer forming a plurality of wires. In the example of FIG. 1, each metallization layer may include one or more inter-die wires 130 that couple selected pads of die 105 to selected pads of die 110 and that couple selected pads of die 110 to selected pads of die 115 (e.g., using a combination of inter-die wires and vias).

In one or more embodiments, interposer 120 is implemented as an entirely passive structure. In particular embodiments, interposer 120 includes one or more active devices and, as such, is considered an active circuit structure. As such, the embodiments described herein are not intended to be limited to solely passive interposers or to solely active interposers.

In the example of FIG. 1, each of dies 105, 110, and 115 is coupled to interposer 120 through a plurality of solder bumps 210. In one or more embodiments, solder-bumps 210 are implemented as micro-bumps. Solder bumps 210 are capable of electrically coupling pads (not shown) of each of dies 105, 110, and 115 to pads (not shown) of interposer 120.

Some pads of interposer 120 coupled to solder bumps 210 may be coupled to "through silicon vias" (TSVs) 215. Each TSV 215 is capable of extending from a pad exposed on the bottom surface of interposer 120 through one or more layers of interposer 120 to couple to another circuit structure. For example, TSVs 215 may extend from a pad on the bottom surface of interposer 120 to an inter-die wire 130 or to another wire within interposer 120. In this regard, one or more TSVs 215 may couple to a solder bump 210.

Interposer 120 is coupled to package substrate 125 through one or more solder bumps 220. In one or more embodiments, solder bumps 220 are implemented as controlled collapse chip connections or "C4" bumps. Package substrate 125 may be coupled to one or more solder bumps 225. Solder bumps 225 are capable of coupling to solder bumps 220 via circuit structures within package substrate 125 including, but not limited to, wires formed by metallization layers, vias, TSVs, and other suitable circuit structures (not shown). In one or more embodiments, solder bumps 225 are implemented as ball grid array (BGA) solder balls. Solder bumps 225 are capable of coupling to external pins of the multi-IC package. As such, signals can be passed among dies 105, 110, and/or 115 and can be passed into and out from multi-die IC 100.

When a circuit design undergoes processing for implementation within a multi-die IC such as multi-die IC 100, there is often significant competition for inter-die wires 130 as these resources are in limited supply. A circuit design processed through a design flow (e.g., synthesis, placement, and routing) will often exhibit congestion problems at the die boundaries due to this competition. Increased competition for inter-die wires 130 often results in the EDA system not being able to achieve timing closure for the circuit design.

Figure 3:
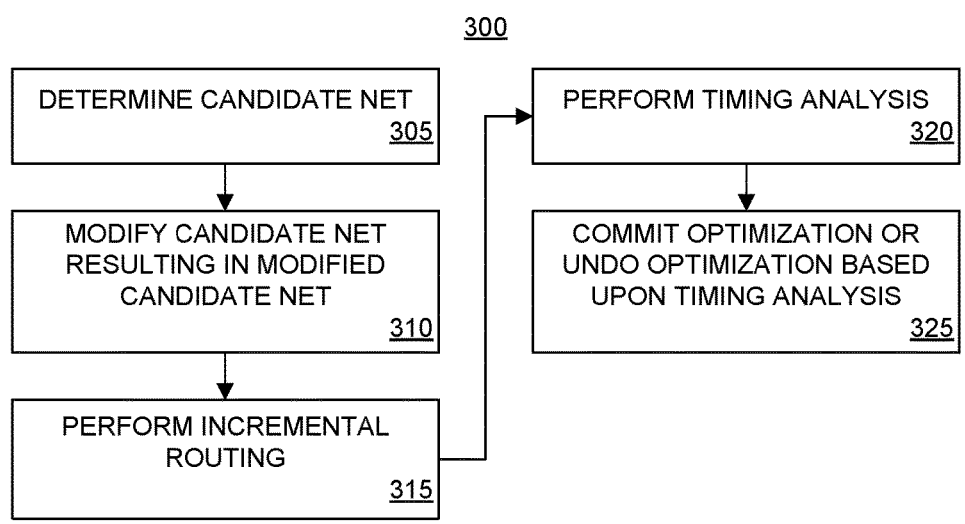
FIG. 3 illustrates an example method for performing physical synthesis on a circuit design.

FIG. 3 illustrates an example method 300 for performing physical synthesis on a circuit design. In accordance with the inventive arrangements described herein, a system, e.g., a data processing system with suitable EDA software, is configured to perform the various operations described herein in connection with method 300. An example of a data processing system is described in greater detail in connection with FIG. 10. The system is capable of performing the operations described on a circuit design that is placed. The circuit design may also be routed.

As defined herein, the term "net," in the context of a circuit or circuit design, means a connection established by one or more wires configured to physically convey signals between at least two endpoints (e.g., a driver and a load). Each endpoint of the net is a synchronous, or clocked, circuit element. One or more combinatorial, or un-clocked, circuit elements may be in the path of the net and located between the endpoints. A net may be formed by a connection between a driver and one or more loads of the driver. In one example embodiment, sequential circuit elements are synchronous circuit elements.

In block 305, the system determines a candidate net of the circuit design. In one or more embodiments, the candidate net is a net of the circuit design that spans two or more dies of the multi-die IC. The candidate net includes an inter-die connection. As an illustrative and non-limiting example, a net that spans two or more dies of a multi-die IC is one that has a driver located in a first die of the multi-die IC and at least one load located in a second and different die of the multi-die IC.

In particular embodiments, the candidate net is also one that is timing critical. Timing criticality is measured using "slack". As defined within this disclosure, the term "slack" means the difference between a required arrival time of a signal at a circuit element, e.g., a signal arriving at a load of a net from the driver, and an estimated arrival time of the signal at the load. A positive slack "s" indicates that the net meets the timing requirement, or timing constraint, for the net. In that case, the delay of the net may be increased by "s" without increasing the overall delay of the circuit design. A negative slack "s" indicates that the net does not meet the timing requirement for the net. The net is slower than the requirement for the net. The estimated arrival time of a signal to the load of the net is after the required arrival time (e.g., the requirement). Accordingly, a "critical" or "timing critical" net refers to a net that has a negative slack and, as such, is not meeting the timing requirement for the net.

In particular embodiments, the candidate net is a high fanout net. A high fanout net is a net that has a number of loads that exceeds a predetermined number of loads. The predetermined number of loads for determining whether a net is a high fanout net may be set in the preferences for the system and may be adjustable. Typically, a high fanout net is a net with hundreds or thousands of loads, though the particular numbers described herein are provided for purposes of illustration and not limitation.

In block 310, the system is capable of modifying the candidate net resulting in a modified candidate net. The system modifies the candidate net by performing physical synthesis on the candidate net. In one or more embodiments, the system optionally performs further analysis on the candidate net to determine whether the candidate net meets a particular criterion or set of criteria. The system is capable of performing physical synthesis on the candidate net of the circuit design in response to determining that the candidate net meets established criteria. For example, the system is capable of performing any of a plurality of different physical synthesis operations on the candidate net based upon the particular criterion, or criteria, that is met.

In performing physical synthesis on the candidate net, the system is capable of unrouting the candidate net. The system is further capable of relocating and/or replicating particular circuit elements of the net. For example, the system is capable of relocating the driver, relocating one or more loads of the driver, and/or replicating the driver as described in greater detail in connection with FIGS. 4-7. The system is further capable of performing a binning technique described in greater detail in connection with FIGS. 8 and 9. As noted, application of the physical optimization(s) to the candidate net results in a modified candidate net, e.g., a modified version of the candidate net.

In block 315, the system is capable of performing incremental routing. For example, after the physical synthesis operation(s) have been performed, the modified candidate net is still unrouted. As such, the system is capable of performing incremental routing on the modified candidate net. Incremental routing refers to a process where the system routes a selected net or nets of a circuit design, e.g., the candidate net, without disturbing or changing other routed nets of the circuit design.

In block 320, the system is capable of performing a timing analysis on the modified candidate net. In one or more embodiments, the system determines a new or updated slack for the candidate net post physical synthesis and post incremental routing.

In block 325, the system selectively commits the optimization from physical synthesis based upon the timing analysis. More particular, the system selectively commits the modified candidate net based upon the timing analysis. If, for example, the timing of the modified candidate net is an improvement over the timing of the candidate net prior to block 310, the system commits the modified candidate. Committing the modified candidate net means that the modified candidate net is stored as part of the circuit design in memory thereby replacing the candidate net originally determined in block 305. If, for example, the timing of the modified candidate net is not an improvement over the timing of the candidate net prior to block 310, the system reverts to the state of the candidate net as it existed in block 305. For example, the system reverses (e.g., undoes) the incremental routing, reverses the physical synthesis operation(s) performed, and restores the candidate net to its original state in the circuit design as the net existed in block 305.

Figure 4:
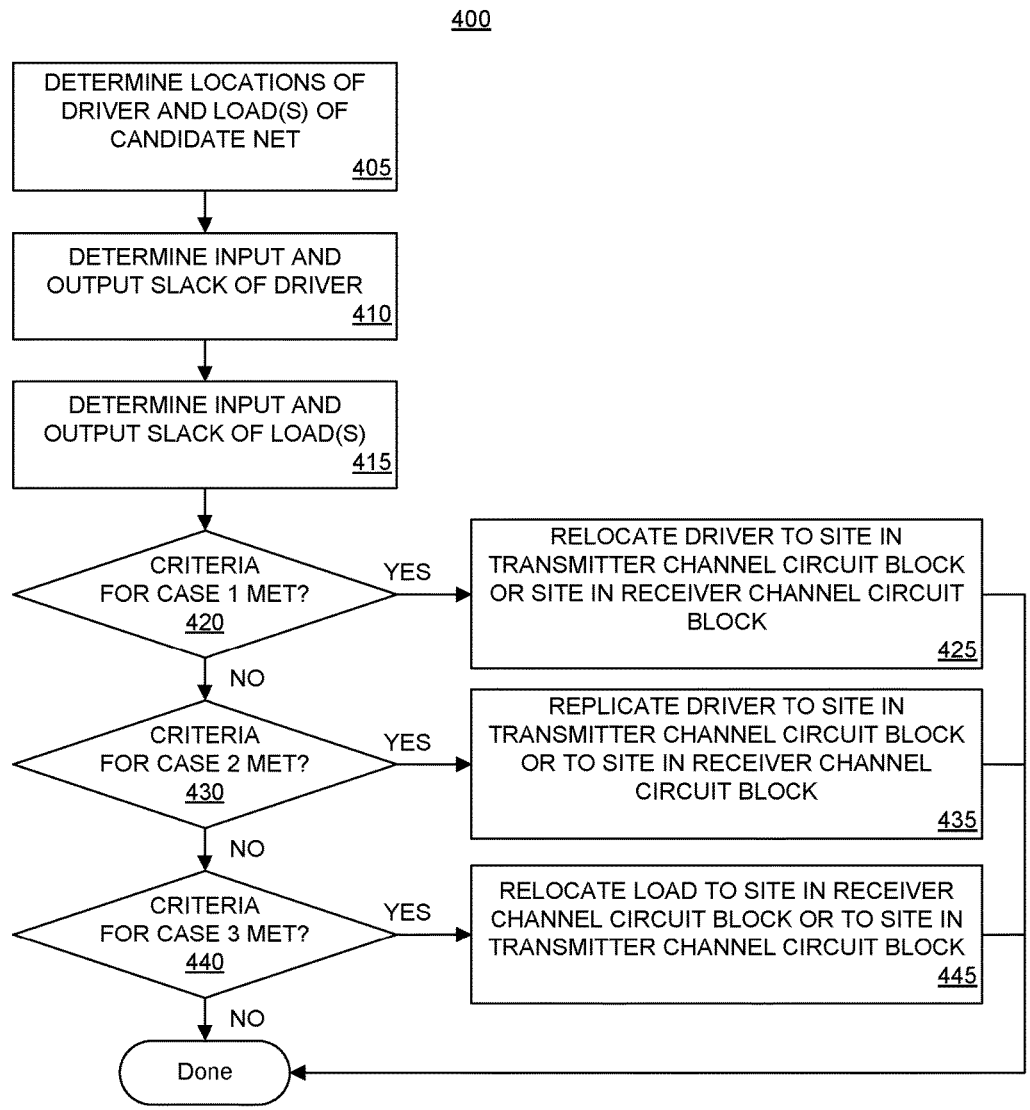
FIG. 4 illustrates another example method for performing physical synthesis on a circuit design.

FIG. 4 illustrates another example method 400 for performing physical synthesis on a circuit design. In one or more embodiments, method 400 is performed to implement block 310 of FIG. 3. It should be appreciated that the candidate net, per FIG. 3, has already been determined to span more than one die and be timing critical.

In block 405, the system is capable of determining the locations of the driver and the load(s) of the candidate net. For example, the system is capable of determining the particular die of the multi-die IC in which the driver of the candidate net is located. The system is capable of determining the particular die of the multi-die IC in which each load of the candidate net is located. Accordingly, from performing block 405, the system is aware of the die in which each load is located and the die in which the driver is located.

In block 410, the system is capable of determining the input slack and the output slack of the driver of the candidate net. For example, the system is capable of determining the slack on the input signal side of the driver. The input slack of the driver refers to the slack of the signal path or net that feeds the driver of the candidate net, e.g., the slack of the net that has the driver of the candidate net as a load. The output slack of the driver is the slack of the candidate net itself with reference to a load of the candidate net.

In block 415, the system is capable of determining the input slack and the output slack of the load(s). The input slack of the load refers to the slack of the candidate net itself, e.g., is the same as the output slack of the driver. The output slack of the load refers to the slack of the signal path or net that is output from the load, e.g., the slack of the signal path connecting a next circuit element as a load to the load of the candidate net.

Blocks 410 and 415 are shown for purposes of explanation. In one or more embodiments, the system is capable of determining the input slacks and/or output slacks of the driver and/or load(s) of the candidate net as part of block 305 of FIG. 3 (e.g., the timing criticality).

Starting in block 420 and continuing through block 445, the system begins comparing information determined about the candidate net with predetermined criteria. Based upon the particular criteria matched to the information for the candidate net, the system is capable of performing different physical synthesis operations on the candidate net.

In block 420, the system is capable of determining whether criteria for case 1 has been met. In one or more embodiments, the case 1 criteria includes the driver of the candidate net being located in a first die, all loads of the candidate net being located in a second die (e.g., all loads of the candidate net are located in a same die that is different from the die including the driver), and an input slack of the driver being less timing critical than an output slack of the driver. In response to determining that the candidate net meets the established criteria for case 1, method 400 continues to block 425. In response to determining that the candidate net does not meet the established criteria for case 1, method 400 continues to block 430.

Continuing with block 425, the system is capable of modifying the candidate net. In one or more embodiments, for case 1, the system performs physical synthesis on the candidate net by relocating the driver of the candidate net to an available site located within a transmitter channel circuit block of the same die that includes the driver. An available site is a site of the IC that does not have a circuit element assigned thereto. In one or more embodiments, for case 1, the system performs physical synthesis on the candidate net by relocating the driver of the candidate net to an available site located within a receiver channel circuit block of the same die that includes the load.

In particular embodiments, the system chooses the available site to which the driver is relocated based upon an estimate of the resulting slacks from performing the operations. For example, the system chooses the site resulting in the least negative slack (or most positive as the case may be) without causing other nets to become timing critical. After block 425 method 400 can end.

Continuing with block 430, the system is capable of determining whether criteria for case 2 has been met. In one or more embodiments, the case 2 criteria includes the driver and one or more loads of the candidate net being located in a first die, one or more other loads of the candidate net being located in a second (and different) die, and an input slack of the driver being less timing critical than an output slack of the driver. In response to determining that the candidate net meets the established criteria for case 2, method 400 continues to block 435. In response to determining that the candidate net does not meet the established criteria for case 2, method 400 continues to block 440.

Continuing with block 435, the system is capable of modifying the candidate net. In one or more embodiments, for case 2, the system performs physical synthesis on the candidate net by replicating the driver to an available site located within a transmitter channel circuit block of the same die that includes the driver. In one or more embodiments, for case 2, the system performs physical synthesis on the candidate net by replicating the driver to an available site located within a receiver channel circuit block of the same die that includes the load.

In particular embodiments, the system chooses the available site to which the driver is replicated based upon an estimate of the resulting slacks from performing the operations. For example, the system chooses the site resulting in the least negative slack (or most positive as the case may be) without causing other nets to become timing critical. After block 435 method 400 can end.

Continuing with block 440, the system is capable of determining whether criteria for case 3 has been met. In one or more embodiments, the case 3 criteria includes a selected load of the candidate net being located in a different die than the driver of the candidate net and an input slack of the load being more timing critical than an output slack of the load. As noted, the input slack of the load refers to the slack of the candidate net. The output slack of the load refers to the slack of the net for which the load is considered the driver (e.g., the next signal path beginning with the load). In response to determining that the candidate net meets the established criteria for case 3, method 400 continues to block 445. In response to determining that the candidate net does not meet the established criteria for case 3, method 400 can end.

Continuing with block 445, the system is capable of modifying the candidate net. In one or more embodiments, for case 3, the system performs physical synthesis on the candidate net by relocating the selected load of the candidate net to an available site located within a receiver channel circuit block within the same die that initially included the selected load. In one or more embodiments, for case 3, the system performs physical synthesis on the candidate net by relocating the selected load of the candidate net to an available site located within a transmitter channel circuit block of the same die that includes the driver.

In particular embodiments, the system chooses the available site to which the load is relocated based upon an estimate of the resulting slacks from performing the operations. For example, the system chooses the site resulting in the least negative slack (or most positive as the case may be) without causing other nets to become timing critical. After block 445, method 400 can end.

Figure 5A:
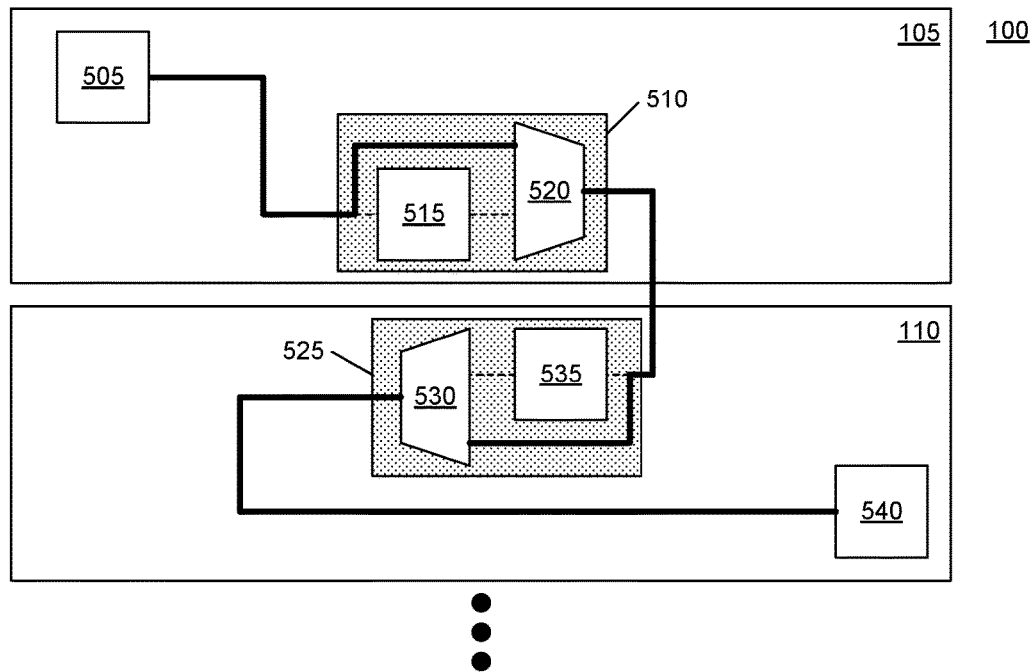
FIGS. 5A-5D illustrate examples of physical synthesis performed on a candidate net.
Figure 5B:
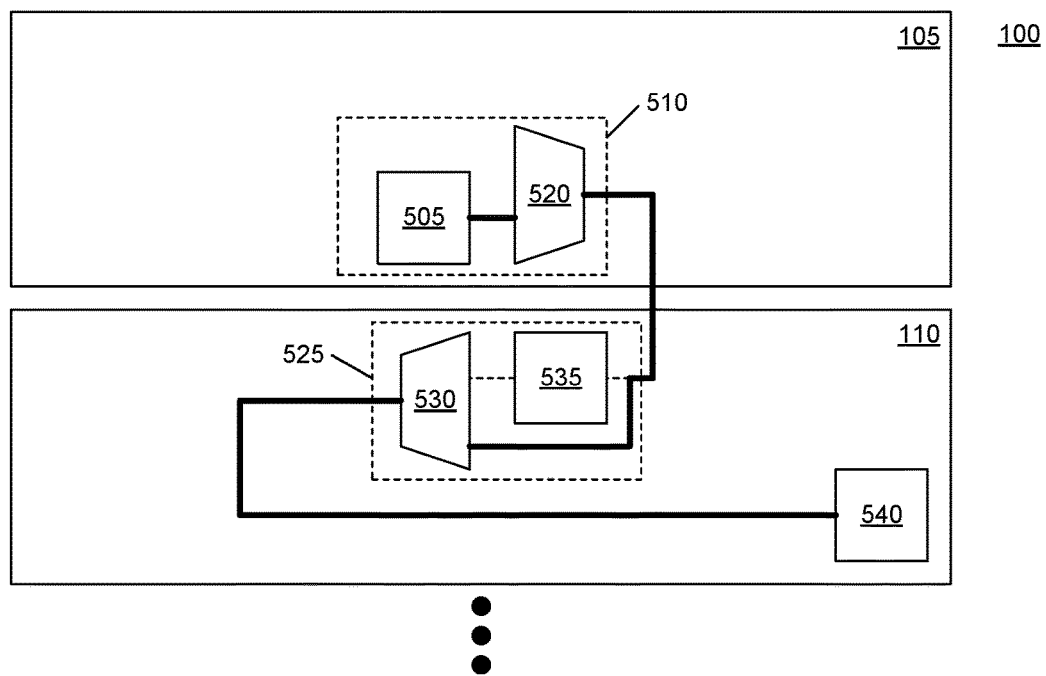

FIGS. 5A-5D illustrate examples of physical synthesis performed on a candidate net for case 1 corresponding to blocks 420 and 425 of FIG. 4. FIGS. 5A and 5B, taken collectively, illustrate a first example of physical synthesis performed on a candidate net for case 1. Referring to FIG. 5A, a candidate net is shown that includes a driver 505 and a load 540. In the example of FIG. 5A, driver 505 is located in die 105, while load 540 is located in die 110. As such, the candidate net spans at least two dies. The candidate net traverses from driver 505 located within die 105 to a transmit channel circuit block 510 located within die 105, through an inter-die wire located in the interposer, into a receiver channel circuit block 525 within die 110, and then to load 540 within die 110. For purposes of illustration die 115 is not shown.

Within FIGS. 5-7, the routed signal path of the candidate net is shown with bolded lines. Dashed lines illustrate unused wires. Within transmitter channel circuit block 510, a transmitter channel circuit block site (site) 515 is included with a multiplexer 520. Within receiver channel circuit block 525, a receiver channel circuit block site (site) 535 is included with a multiplexer 530. The dashed lines before and after each of sites 515 and 535 are routing resources that are part of the programmable IC (e.g., are part of transmitter channel circuit block 510 and part of receiver channel circuit block 525, respectively) but are not used to route the candidate net.

As defined within this disclosure, the term "transmitter channel circuit block" refers to a circuit block through which a signal within a die must exit in order to pass from the die including the transmitter channel circuit block to a different die of a multi-die IC. The term "receiver channel circuit block" means a circuit block through which a signal must pass in order to enter a die from another, different die of a multi-die IC.

In the example of FIG. 5, site 515 and site 535 are flip-flops. The flip-flops of a transmitter channel circuit block and/or a receiver channel circuit block may be used as part of a net passing through the circuit block or may be bypassed as is the case in the example of FIG. 5A.

In the example of FIG. 5A, driver 505 is located in die 105, all loads of the candidate net (e.g., load 540) are located in die 110, and the input slack of driver 505 is less timing critical than the output slack of driver 505. Accordingly, the system applies a physical optimization to the candidate net to generate the modified candidate net illustrated in FIG. 5B. FIG. 5B illustrates that the system has relocated driver 505 from its original location shown in FIG. 5A to site 515 within transmitter channel circuit block 510. Site 515 is an available site. Since the input slack of driver 505 is less timing critical than the output slack, moving driver 505 closer to load 540 takes advantage of the slack differential. The relocation illustrated in FIG. 5A results in a longer delay on the input side of driver 505 in exchange for reducing timing criticality on the output side of driver 505.

Figure 5C:
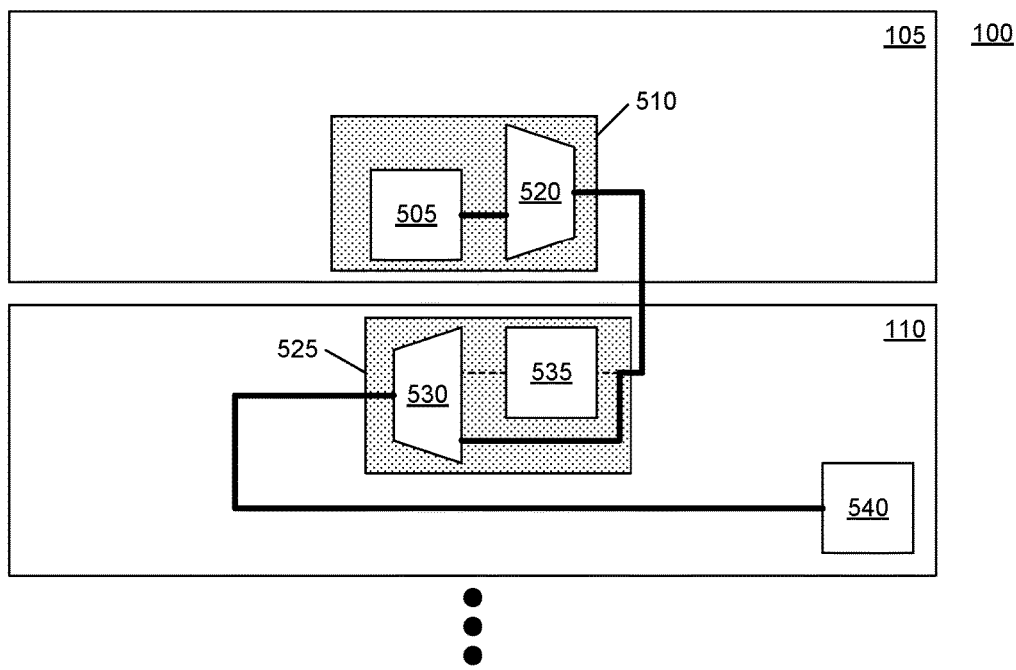
Figure 5D:
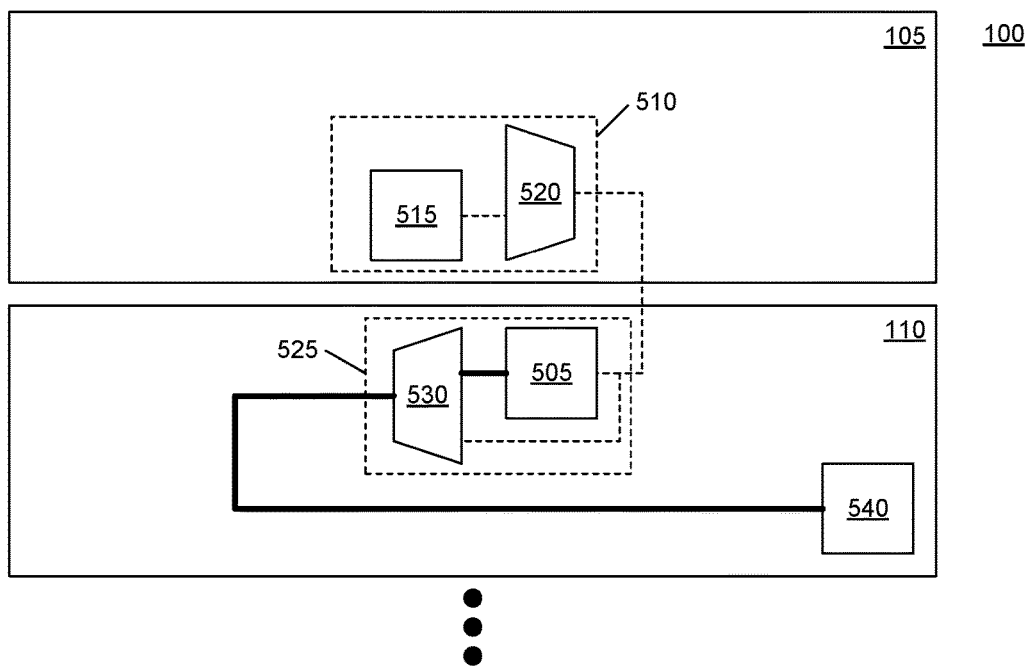

FIGS. 5C and 5D, taken collectively, illustrate a second example of physical synthesis performed on a candidate net for case 1. In the example of FIG. 5C, driver 505 is initially located in the site (e.g., site 515) of transmitter channel circuit block 510 in die 105. The candidate net bypasses site 535 within receiver channel circuit block 525 in die 110. In the example of FIG. 5C, driver 505 is located in die 105, all loads of the candidate net (e.g., load 540) are located in die 110, and the input slack of driver 505 is less timing critical than the output slack of driver 505. Accordingly, the system applies a physical optimization to the candidate net of FIG. 5C to generate the modified candidate net illustrated in FIG. 5D.

FIG. 5D illustrates that the system has relocated driver 505 from its original location shown in FIG. 5C to site 535 within receiver channel circuit block 525. Site 535 is an available site. Since the input slack of driver 505 is less timing critical than the output slack, moving driver 505 closer to load 540 takes advantage of the slack differential. The relocation illustrated in FIG. 5D results in a longer delay on the input side of driver 505 in exchange for reducing timing criticality on the output side of driver 505.

In one or more embodiments, when driver 505 is initially located within die 105 and not within site 515 of transmitter channel circuit block 510 (e.g., as pictured in FIG. 5A), the system is capable of determining whether to relocate driver 505 to site 515 within transmitter channel circuit block 510 within die 105 or to site 535 within receiver channel circuit block 525 within die 110. In particular embodiments, the system selects either site 515 or site 535 based upon timing. For example, the system is capable of selecting either site 515 or site 535 as the destination for relocating driver 505 based upon which site results in the most improved slacks.

Figure 6A:
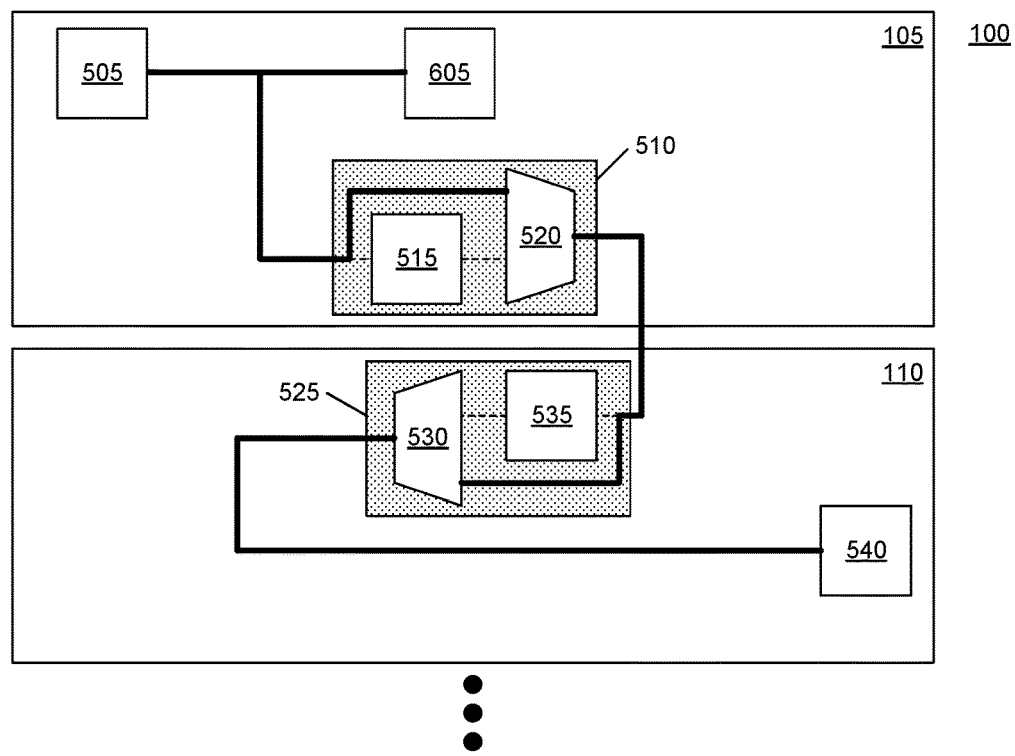
FIGS. 6A-6C illustrate examples of physical synthesis performed on a candidate net.
Figure 6B:
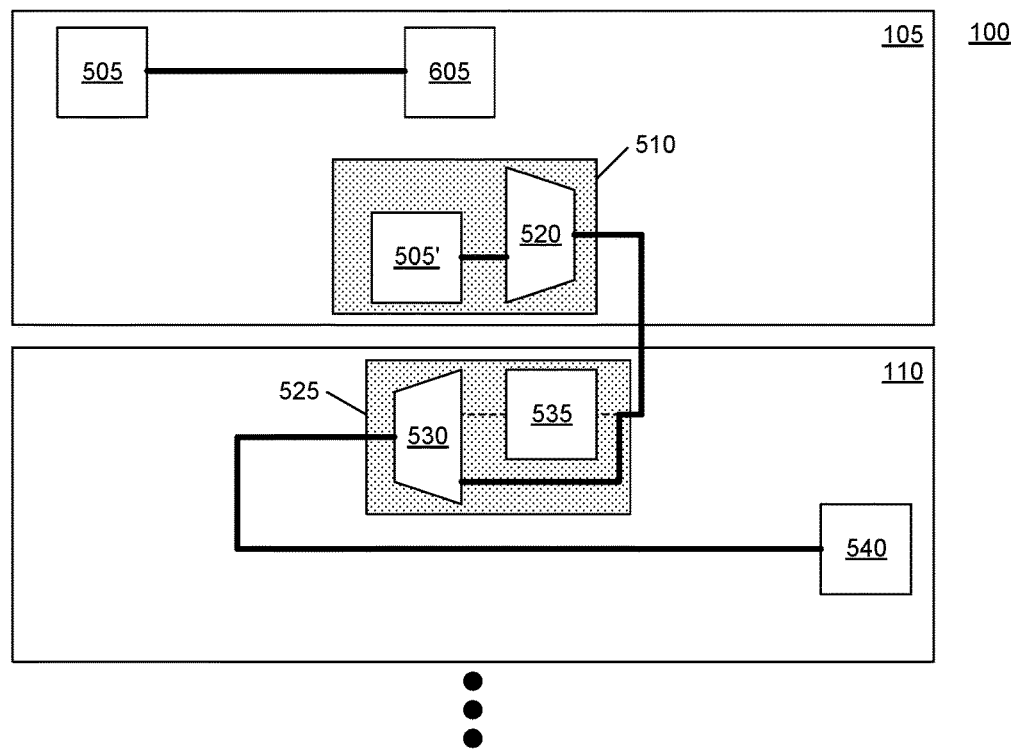
Figure 6C:
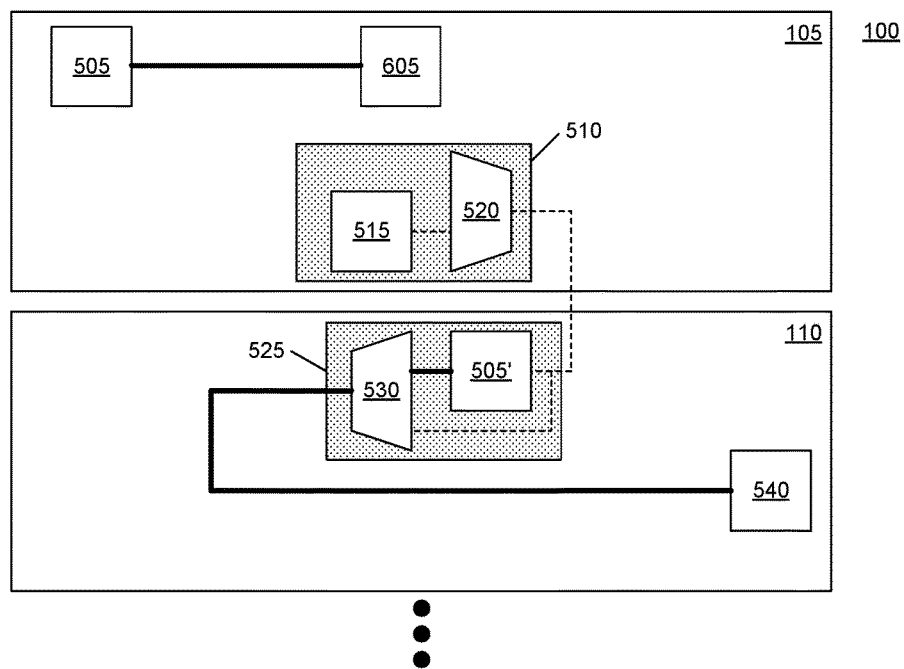

FIGS. 6A-6C illustrate examples of physical synthesis performed on a candidate net for case 2 corresponding to blocks 430 and 435 of FIG. 4. FIGS. 6A and 6B, taken collectively, illustrate a first example of physical synthesis performed on a candidate net for case 2. Referring to FIG. 6A, the candidate net is substantially similar to the candidate net shown in FIG. 5A, with the exception that there is an additional load 605 for the candidate net included in die 105. Load 605 is located in the same die as driver 505. Still, the candidate net spans at least two dies. For purposes of discussion, it can be assumed that the signal path from driver 505 to load 540 of the candidate net is the timing critical portion.

In the example of FIG. 6A, driver 505 and one or more loads of the candidate net (e.g., load 605) are located in die 105, one or more other loads of the candidate net (e.g., load 540) are located in die 110, and an input slack of driver 505 is less timing critical than an output slack of driver 505. Accordingly, the system applies a physical optimization to the candidate net of FIG. 6A to generate the modified candidate net illustrated in FIG. 6B.

FIG. 6B illustrates that the system has replicated driver 505, which is shown as driver 505'. The replicated driver 505' is placed or located in site 515 of transmitter channel circuit block 510. The original instance of driver 505 remains in the same location shown in FIG. 5A to drive load 605. Since the input slack of driver 505 is less timing critical than the output slack, replicating driver 505 to create driver 505', which is closer to load 540, takes advantage of the slack differential. The replication illustrated in FIG. 6B results reduces the timing criticality of load 540.

FIG. 6C illustrates a second example of physical synthesis performed on a candidate net for case 2. FIG. 6C illustrates an alternative replication operation from that shown in FIG. 6B that can be performed by the system in processing the candidate net of FIG. 6A. In the example of FIG. 6C, the system applies a physical optimization to the candidate net of FIG. 6A to generate the modified candidate net of FIG. 6C.

In the example of FIG. 6C, the system has replicated driver 505, which is shown as driver 505'. The replicated driver 505' is placed or located in site 535 of receiver channel circuit block 525. The original instance of driver 505 remains in the same location shown in FIG. 5A to drive load 605. Since the input slack of driver 505 is less timing critical than the output slack, replicating driver 505 to create driver 505', which is closer to load 540, takes advantage of the slack differential. The replication illustrated in FIG. 6C results reduces the timing criticality of load 540.

In particular embodiments, the system performs the operation illustrated in FIG. 6B or FIG. 6C based upon timing. For example, the system is capable of selecting either site 515 or site 535 as the destination for replicating driver 505 based upon which site results in the most improved slacks.

Figure 7A:
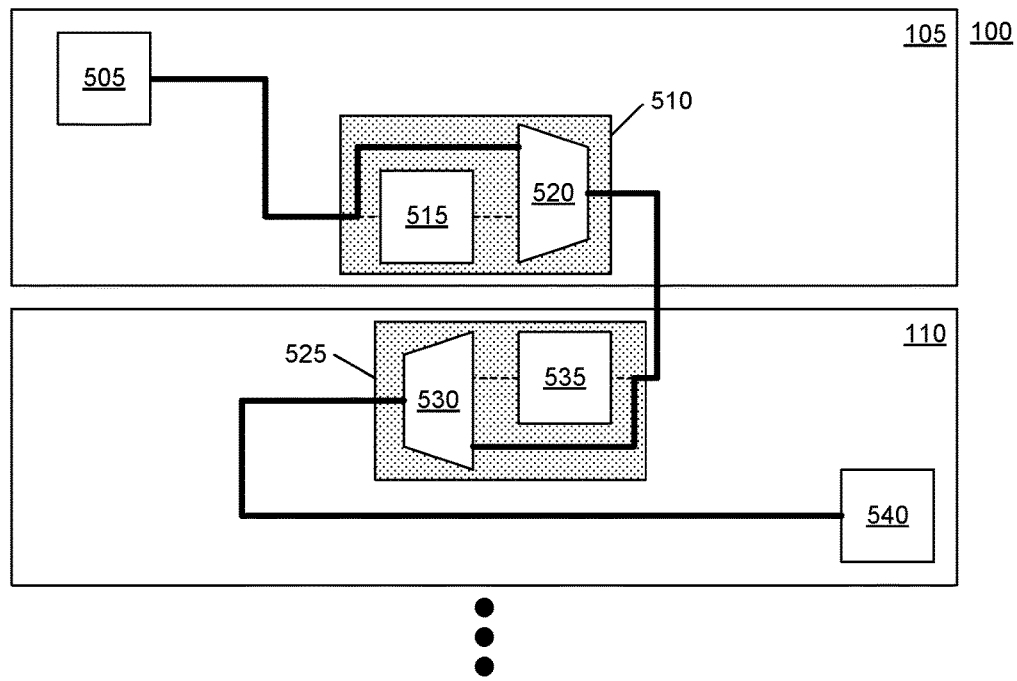
FIGS. 7A-7C illustrate further examples of physical synthesis performed on a candidate net.
Figure 7B:
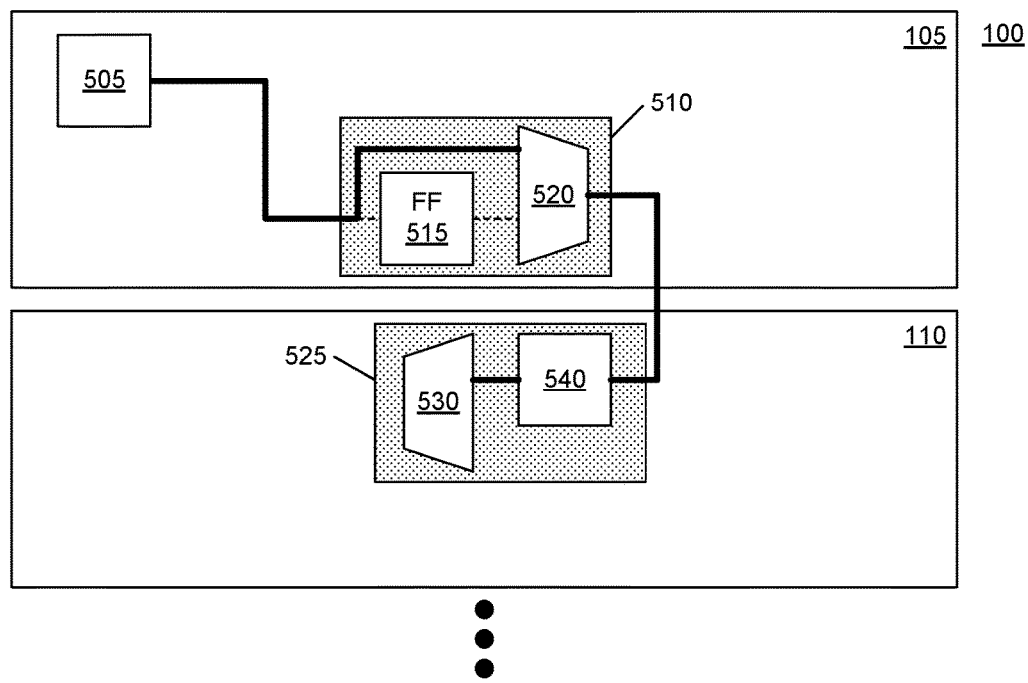
Figure 7C:
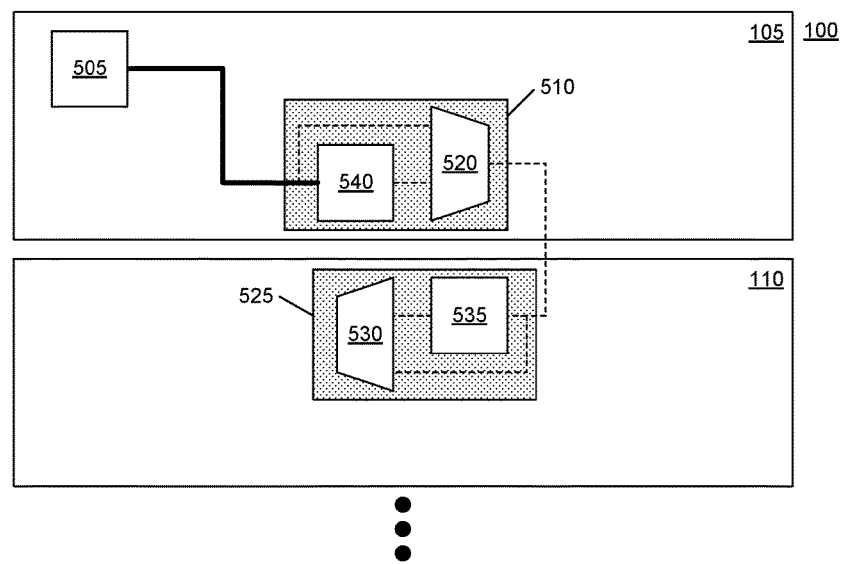

FIGS. 7A-7C illustrate examples of physical synthesis performed on a candidate net for case 3 corresponding to blocks 440 and 445 of FIG. 4. FIGS. 7A and 7B, taken collectively, illustrate a first example of physical synthesis performed for case 3. Referring to FIG. 7A, the candidate net is the same as the candidate net shown in FIG. 5A. The candidate net spans at least two dies.

In the example of FIG. 7A, driver 505 is located in die 105, load 540 is located in die 110, e.g., a different die than driver 505, and the input slack of load 540 is more timing critical than the output slack of load 540. Accordingly, the system applies a physical optimization to the candidate net of FIG. 7A to generate the candidate net illustrated in FIG. 7B.

FIG. 7B illustrates that the system has relocated load 540 from its original location shown in FIG. 7A to site 535 within receiver channel circuit block 525 as shown in FIG. 7B. Since the input slack of load 540 was more timing critical than the output slack of load 540 in the example of FIG. 7A, relocating load 540 as illustrated in FIG. 7B makes the input timing of load 540 less timing critical by borrowing time from the output side of load 540.

FIG. 7C illustrates a second example of physical synthesis performed for case 3. FIG. 7C illustrates an alternative relocation operation that can be performed by the system in lieu of the relocation operation shown in FIG. 7B. In the example of FIG. 7C, the system applies a physical optimization to the candidate net of FIG. 7A resulting in the modified candidate net illustrated in FIG. 7C. In the example of FIG. 7C, the system has relocated load 540 from its original location shown in FIG. 7A to site 515 within transmitter channel circuit block 510 as shown in FIG. 7C. Since the input slack of load 540 was more timing critical than the output slack of load 540 in the example of FIG. 7A, relocating load 540 as illustrated in FIG. 7C makes the input timing of load 540 less timing critical by borrowing time from the output side of load 540.

In particular embodiments, the system performs the operation illustrated in FIG. 7B or FIG. 7C based upon timing. For example, the system is capable of selecting either site 515 or site 535 as the destination for relocating load 540 based upon which site results in the most improved slacks.

Figure 8:
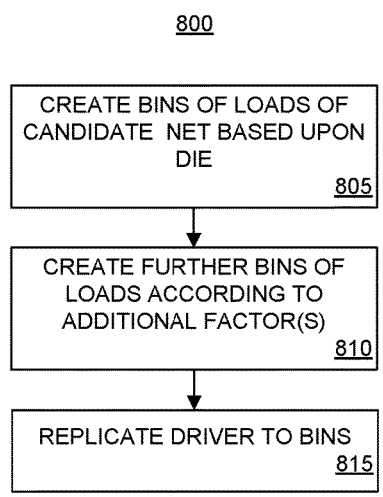
FIG. 8 illustrates another example method for performing physical synthesis on a candidate net.

FIG. 8 illustrates another example method 800 for performing physical synthesis on a circuit design. In one or more embodiments, method 800 may be performed to implement block 310 of FIG. 3. The system is capable of performing method 800 on a candidate net that includes loads located in more than one die of the multi-die IC. The candidate net may be one that the system has determined to be a high fanout net. Further, as noted, the net is timing critical. As discussed, in performing the physical synthesis operations described herein, the candidate net first may be unrouted.

In block 805, the system is capable of creating bins of loads of the candidate net based upon die. The system, at least initially, creates one bin corresponding to each die that includes a load of the candidate net. Each load of the candidate net located in a particular die is added to the bin corresponding to the die. As an illustrative and non-limiting example, a candidate net may include a first plurality of loads located in a first die and a second plurality of loads located in a second die. The system creates bin 1 for the first die and adds each load of the first plurality of loads located in the first die to bin 1. The system creates bin 2 for the second die and adds each load of the second plurality of loads located in the second die to bin 2.

In block 810, the system optionally creates further bins of loads according to one or more additional factors. Any additional bins created are created as a subset of, or from, the bins created in block 805. As an illustrative and non-limiting example, loads of the candidate net can be binned based upon location. Each load, for example, has an (x, y) coordinate within a die or within the multi-die IC. Those loads that are located within a predetermined distance of one another may be placed in a further bin. Because the loads of the candidate net are already binned initially based upon die, only those loads of the candidate net that are within a same die may be placed together in a further bin based upon location or distance.

Referring to the prior example, the system is capable of creating one or more additional bins, e.g., sub-bins, from bin 1. As such, the system is capable of creating further bins from bin 1 where each further bin includes one or more loads from the first plurality of loads based upon location and/or distance. Similarly, the system is capable of creating one or more additional bins, e.g., sub-bins, from bin 2. As such, the system is capable of creating further bins from bin 2 where each further bin includes one or more loads from the second plurality of loads based upon location and/or distance.

In creating further bins as described in block 810, the system may apply one or more additional processing rules that control load membership in the bins. For example, the system may create bins so that the total number of loads in a bin does not exceed a predetermined threshold number of loads. Thus, despite a set of nodes being located sufficiently close to one another to be located in a same bin, the system may create more than one bin for the set of loads to ensure that the total number of loads in each bin does not exceed the predetermined threshold number of loads.

In block 815, the system is capable of replicating the driver to the bins. The system is capable of replicating the driver so that each bin that is created is driven by either the original driver of the candidate net or a replicated version of the driver that is added to the circuit design. Subsequent to block 815, the candidate net can be incrementally routed as described in connection with FIG. 3.

Figure 9A:
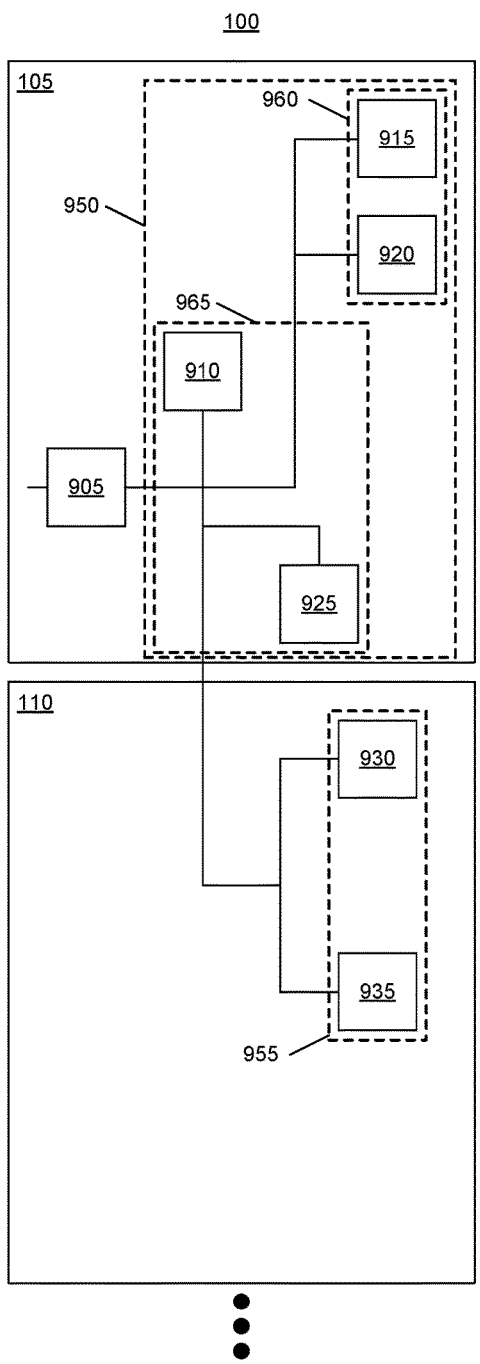
FIGS. 9A and 9B, taken collectively, illustrate another example of physical synthesis performed on a candidate net.
Figure 9B:
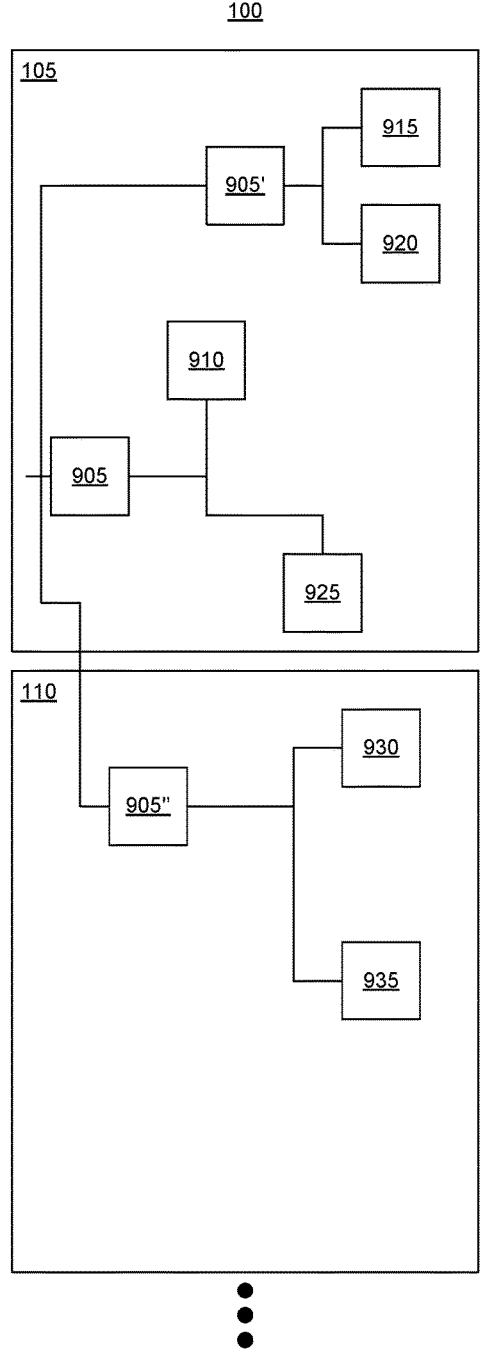

FIGS. 9A and 9B, taken collectively, illustrate another example of physical synthesis performed on a candidate net. FIGS. 9A and 9B illustrate the processing performed as described in connection with FIG. 8. In the example of FIG. 9, die 105 and die 110 are shown. Die 115 is omitted for ease of illustration. Bins are illustrated with dashed lines.

Referring to FIG. 9A, the candidate net has a driver 905 and a plurality of loads 910, 915, 920, 925, 930, and 935. Loads 910-925 are located in die 105. Loads 930-935 are located in die 110. In this example, the system is capable of first creating bins for the loads of the candidate net based upon die. More particularly, the system performs a die-aware binning that bins the loads according to location and the particular die in which each load is located.

As such, the system creates a first bin 950. Bin 950 corresponds to die 105 and includes each load of the candidate net located in die 105. Bin 950 includes loads 910, 915, 920, and 925. The system creates a second bin 955. Bin 955 corresponds to die 110 and includes each load of the candidate net located in die 110. Bin 955 includes loads 930 and 935. The die-aware binning is performed so that each bin includes only loads located in a same die (e.g., no bin includes loads from two different dies).

After initially creating bins based upon the dies, the system is capable of creating additional bins based upon one or more other factors. For purposes of illustration, the system is capable of using distance between loads as a secondary binning technique. Referring again to FIG. 9A, the system is capable of creating additional bins from bin 950. For example, the system is capable of subdividing bin 950 into two or more smaller bins. Each resulting bin may only include loads located in die 105. In the example of FIG. 9A, the system creates bin 960 and bin 965 from bin 950. The system is capable of determining the distance between different pairs of loads and performing the further binning based upon distance. Thus, bin 960 includes loads 915 and 920, where loads 915 and 920 are within a predetermined distance of one another to be placed in a same bin (or sub-bin). Bin 965 includes loads 910 and 925, where loads 910 and 925 are located within a predetermined distance of one another to be placed in a same bin (or sub-bin). In the case of die 110, the system need not perform any further binning. Bin 955 includes loads 930 and 935.

Referring to FIG. 9B, the system has replicated driver 905 to create two additional driver instances shown as drivers 905' and 905". The original instance of driver 905 is used to drive loads 910 and 925 of bin 965. Replicated driver 905' is used to drive loads 915 and 920 of bin 960. Replicated driver 905", which is placed in die 110, drives loads 930 and 935 of bin 955. In this regard, the driver is replicated so that each bin is driven by the driver, whether the original instance of the driver or a replicated version of the driver. Further, each replicated driver is located in the same die as the bin that the replicated driver is to drive.

The example binning described in connection with FIGS. 8 and 9 is die aware. Other physical synthesis techniques that are not die aware, may further exacerbate the congestion at the edges of dies by creating additional die-to-die signal crossings for the candidate net. By first binning based upon die as described, the number of die-to-die crossings in the candidate net can be reduced.

In the example of FIG. 9, loads 925 and 930 are close to one another when the coordinates of each load are considered without reference to die. Without first binning based upon die, the system would group loads 925 and 930 into a same bin and attempt to drive each of loads 925 and 930 using a same driver (or replicated version of the driver). This means that load 935 would be driven by a different driver or replicated version of the driver than loads 925 and 930. As a result, an additional die-to-die connection would need to be established to drive load 935. Further, a lesser quality of result would be achieved (e.g., slower circuit implementation). The example binning described herein in connection with FIGS. 8 and 9 eliminates this additional die-to-die crossing. Further, as discussed, by reducing congestion at the die boundaries, the runtime operation of the EDA system is improved.

Use of the different physical synthesis techniques described within this disclosure are capable of providing a quality of result improvement in the resulting circuit designs of up to approximately 8.5 percent (e.g., increase in operational or clock speed). Further, as noted, by alleviating congestion at die boundaries, the EDA system is capable of completing a design flow on the circuit design to meet timing requirements in less time than is otherwise the case.

Figure 10:
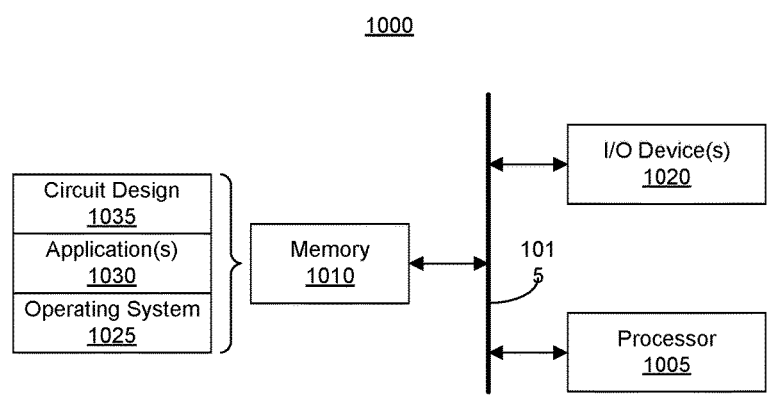
FIG. 10 illustrates an example data processing system for use with one or more embodiments described herein.

FIG. 10 illustrates an example of a data processing system (system) 1000 for use with one or more embodiments described herein. System 1000 is capable of performing the various operations described herein relating to a design flow and/or physical synthesis on a circuit design. In an aspect, system 1000 is implemented as a computer or other system or device that is suitable for storing and/or executing program code.

System 1000 includes at least one processor 1005. Processor 1005 is coupled to memory 1010 through interface circuitry 1015. System 1000 stores computer readable instructions (also referred to as "program code") within memory 1010. Memory 1010 is an example of computer readable storage media. Processor 1005 executes the program code accessed from memory 1010 via interface circuitry 1015.

Memory 1010 includes one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM", synchronous DRAM or "SDRAM", and double data rate RAM or "DDR RAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 1000 may also include one or more cache memories (not shown) that provide temporary storage of at least some program code in order to reduce the number of times program code must be retrieved from a bulk storage device during execution.

Memory 1010 is capable of storing program code. The program code may include routines, programs, objects, components, logic, data structures, and so on. For purposes of illustration, memory 1010 stores an operating system 1025, one or more application(s) 1030, and a circuit design 1035. In one or more embodiments, application(s) 1030 include an EDA application. The EDA application is capable of performing a design flow (e.g., synthesis, placement, routing, and/or bitstream generation) and physical synthesis as described herein on circuit design 1035.

In an aspect, operating system 1025 and application(s) 1030, being implemented in the form of executable program code, are executed by system 1000 and, more particularly, by processor 1005, to perform the operations described within this disclosure. As such, operating system 1025 and application(s) 1030 may be considered an integrated part of system 1000. Further, it should be appreciated that any data used, generated, and/or operated upon by system 1000 (e.g., processor 1005) are functional data structures that impart functionality when employed as part of the system.

Examples of interface circuitry 1015 include, but are not limited to, an input/output (I/O) subsystem, an I/O interface, a bus system, and a memory interface. For example, interface circuitry 1015 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

System 1000 further may include one or more input/output (I/O) devices 1020 coupled to interface circuitry 1015. I/O devices 1020 may be coupled to system 1000, e.g., interface circuitry 1015, either directly or through intervening I/O controllers. Examples of I/O devices 1020 include, but are not limited to, a keyboard, a display device, a pointing device, one or more communication ports, a network adapter, etc. A network adapter refers to circuitry that enables system 1000 to become coupled to other systems, computer systems, remote printers, and/or remote storage devices through intervening private or public networks. Modems, cable modems, Ethernet cards, and wireless transceivers are examples of different types of network adapters that may be used with system 1000.

System 1000 may include fewer components than shown or additional components not illustrated in FIG. 10 depending upon the particular type of device and/or system that is implemented. In addition, the particular operating system and/or application(s) included may vary according to device and/or system type as may the types of I/O devices included. Further, one or more of the illustrative components may be incorporated into, or otherwise form a portion of, another component. For example, a processor may include at least some memory.

Figure 11:
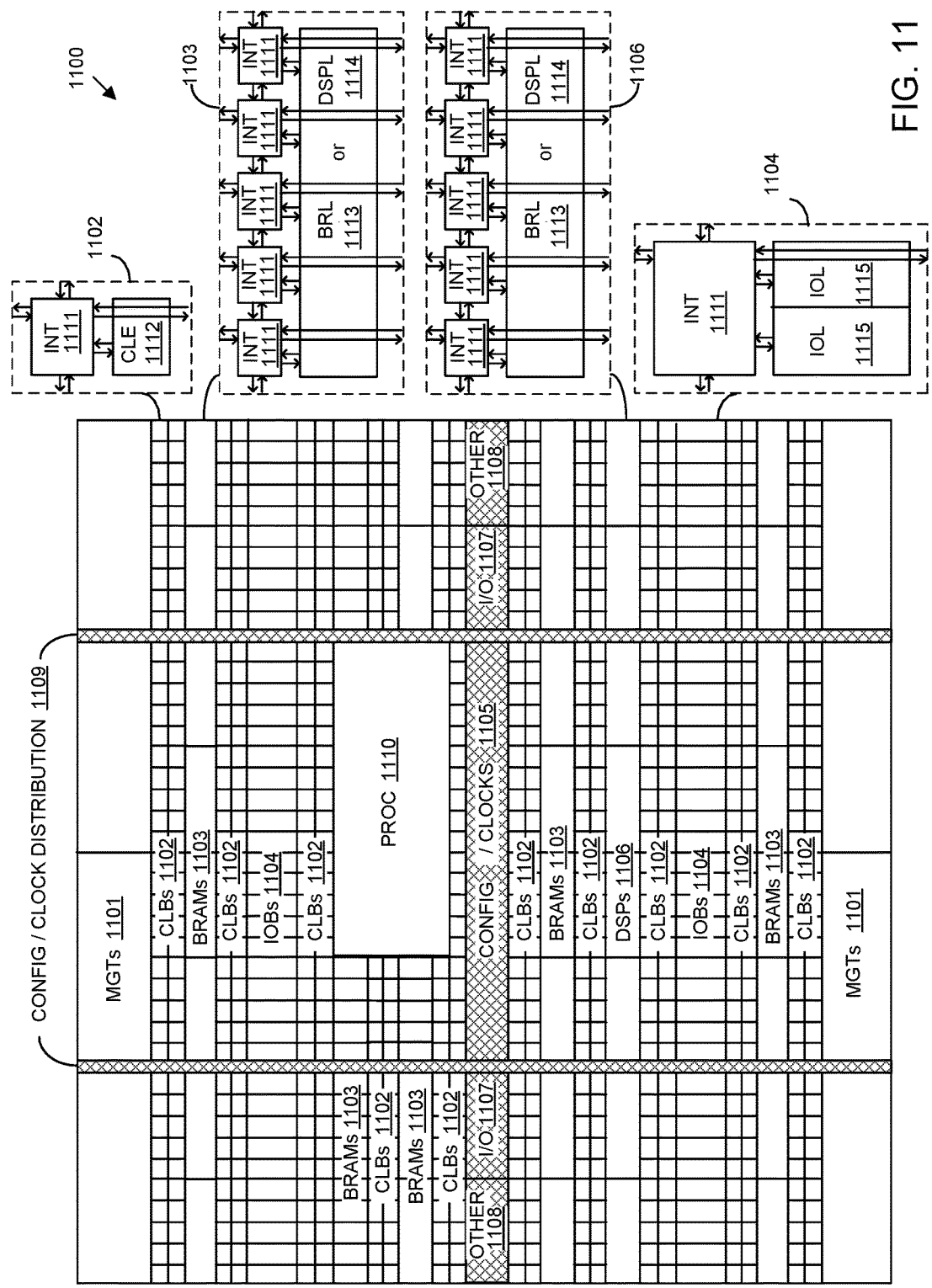
FIG. 11 illustrates an example architecture for an IC.

FIG. 11 illustrates an example architecture 1100 for an IC. In one aspect, architecture 1100 may be implemented within a programmable IC. For example, architecture 1100 may be used to implement an FPGA. Architecture 1100 may be used to implement one or more of dies 105, 110, and/or 115 as described within this disclosure.

Architecture 1100 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1100 includes several different types of programmable circuit, e.g., logic, blocks. For example, architecture 1100 may include a large number of different programmable tiles including multi-gigabit transceivers (MGTs) 1101, configurable logic blocks (CLBs) 1102, random access memory blocks (BRAMs) 1103, input/output blocks (IOBs) 1104, configuration and clocking logic (CONFIG/CLOCKS) 1105, digital signal processing blocks (DSPs) 1106, specialized I/O blocks 1107 (e.g., configuration ports and clock ports), and other programmable logic 1108 such as digital clock managers, analog-to-digital converters, system monitoring logic, and so forth.

In some ICs, each programmable tile includes a programmable interconnect element (INT) 1111 having standardized connections to and from a corresponding INT 1111 in each adjacent tile. Therefore, INTs 1111, taken together, implement the programmable interconnect structure for the illustrated IC. Each INT 1111 also includes the connections to and from the programmable logic element within the same tile, as shown by the examples included at the top of FIG. 11.

For example, a CLB 1102 may include a configurable logic element (CLE) 1112 that may be programmed to implement user logic plus a single INT 1111. A BRAM 1103 may include a BRAM logic element (BRL) 1113 in addition to one or more INTs 1111. Typically, the number of INTs 1111 included in a tile depends on the height of the tile. As pictured, a BRAM tile has the same height as five CLBs, but other numbers (e.g., four) also may be used. A DSP tile 1106 may include a DSP logic element (DSPL) 1114 in addition to an appropriate number of INTs 1111. An 10B 1104 may include, for example, two instances of an I/O logic element (IOL) 1115 in addition to one instance of an INT 1111. The actual I/O pads connected to IOL 1115 may not be confined to the area of IOL 1115.

In the example pictured in FIG. 11, a columnar area near the center of the die, e.g., formed of regions 1105, 1107, and 1108, may be used for configuration, clock, and other control logic. Horizontal areas 1109 extending from this column may be used to distribute the clocks and configuration signals across the breadth of the programmable IC.

Some ICs utilizing the architecture illustrated in FIG. 11 include additional logic blocks that disrupt the regular columnar structure making up a large part of the IC. The additional logic blocks may be programmable blocks and/or dedicated circuitry. For example, a processor block depicted as PROC 1110 spans several columns of CLBs and BRAMs.

In one aspect, PROC 1110 may be implemented as dedicated circuitry, e.g., as a hardwired processor, that is fabricated as part of the die that implements the programmable circuitry of the IC. PROC 1110 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1110 may be omitted from architecture 1100 and replaced with one or more of the other varieties of the programmable blocks described. Further, such blocks may be utilized to form a "soft processor" in that the various blocks of programmable circuitry may be used to form a processor that can execute program code as is the case with PROC 1110.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 11 that are external to PROC 1110 such as CLBs 1102 and BRAMs 1103 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1110.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 1110 or a soft processor. In some cases, architecture 1100 includes a dedicated configuration processor that loads the configuration bitstream to the appropriate configuration memory and/or processor memory. The dedicated configuration processor does not execute user-specified program code. In other cases, architecture 1100 may utilize PROC 1110 to receive the configuration bitstream, load the configuration bitstream into appropriate configuration memory, and/or extract program code for execution.

FIG. 11 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 11 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1110 within the IC are for purposes of illustration only and are not intended as limitations.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to methods for physical synthesis for a circuit design. In one aspect, a method can include determining, using a processor, a candidate net from a circuit design, wherein the candidate net spans a plurality of dies of a multi-die integrated circuit (IC), and modifying, using the processor, the candidate net by relocating a driver or a load of the candidate net or replicating the driver of the candidate net, resulting in a modified candidate net. The method can include performing incremental routing, using the processor, on the modified candidate net and selectively committing, using the processor, the modified candidate net based upon a timing analysis of the modified candidate net.

In an aspect, the circuit design is placed. In another aspect, the circuit design is also routed.

In another aspect, modifying the candidate net can include relocating the driver of the candidate net to a site in a transmitter channel circuit block or to a site in a receiver channel circuit block.

In another aspect, relocating the driver is performed in response to determining that the driver of the candidate net is located in a first die of the plurality of dies, all loads of the candidate net are located in a second die of the plurality of dies, and an input slack of the driver is less timing critical than an output slack of the driver.

In another aspect, modifying the candidate net includes replicating the driver of the candidate net to a site in a transmitter channel circuit block or to a site in a receiver channel circuit block.

In another aspect, replicating the driver is performed in response to determining that the driver and the load of the candidate net are located in a first die of the plurality of dies, a further load of the candidate net is located in a second die of the plurality of dies, and an input slack of the driver is less timing critical than an output slack of the driver.

In another aspect, modifying the candidate net includes relocating the load of the candidate net to a site in a receiver channel circuit block or to a site in a transmitter channel circuit block.

In another aspect, relocating the load is performed in response to determining that the load is located in a different die of the plurality of dies than the driver of the candidate net and that an input slack of the load is more timing critical than an output slack of the load.

In another aspect, modifying the candidate net includes creating bins of loads of the candidate net based, at least in part, upon the die of the plurality of dies in which each load is located and replicating the driver of the candidate net to the bins.

One or more embodiments are directed to systems for physical synthesis for a circuit design. In one aspect, a system includes a memory configured to store program code and a processor coupled to the memory. The processor, in response to executing the program code, is configured to initiate operations. The operations include determining a candidate net from a circuit design, wherein the candidate net spans a plurality of dies of a multi-die IC, and modifying the candidate net by relocating a driver or a load of the candidate net or replicating the driver of the candidate net, resulting in a modified candidate net. The operations can include performing incremental routing on the modified candidate net and selectively committing the modified candidate net based upon a timing analysis of the modified candidate net.

In an aspect, the circuit design is placed. In another aspect, the circuit design is also routed.

In another aspect, modifying the candidate net can include relocating the driver of the candidate net to a site in a transmitter channel circuit block or to a site in a receiver channel circuit block.

In another aspect, relocating the driver is performed in response to determining that the driver of the candidate net is located in a first die of the plurality of dies, all loads of the candidate net are located in a second die of the plurality of dies, and an input slack of the driver is less timing critical than an output slack of the driver.

In another aspect, modifying the candidate net includes replicating the driver of the candidate net to a site in a transmitter channel circuit block or to a site in a receiver channel circuit block.

In another aspect, replicating the driver is performed in response to determining that the driver and the load of the candidate net are located in a first die of the plurality of dies, a further load of the candidate net is located in a second die of the plurality of dies, and an input slack of the driver is less timing critical than an output slack of the driver.

In another aspect, modifying the candidate net includes relocating the load of the candidate net to a site in a receiver channel circuit block or to a site in a transmitter channel circuit block.

In another aspect, relocating the load is performed in response to determining that the load is located in a different die of the plurality of dies than the driver of the candidate net and that an input slack of the load is more timing critical than an output slack of the load.

In another aspect, modifying the candidate net includes creating bins of loads of the candidate net based, at least in part, upon the die of the plurality of dies in which each load is located and replicating the driver of the candidate net to the bins.

One or more embodiments are directed to computer program products for physical synthesis for a circuit design. In one aspect, a computer program product includes a computer readable storage medium having program code stored thereon. The program code is executable by a processor to perform operations including determining a candidate net from a circuit design, wherein the candidate net spans a plurality of dies of a multi-die IC, and modifying the candidate net by relocating a driver or a load of the candidate net or replicating the driver of the candidate net, resulting in a modified candidate net. The operations can include performing incremental routing on the modified candidate net and selectively committing the modified candidate net based upon a timing analysis of the modified candidate net.

In an aspect, the circuit design is placed. In another aspect, the circuit design is also routed.

In another aspect, modifying the candidate net can include relocating the driver of the candidate net to a site in a transmitter channel circuit block or to a site in a receiver channel circuit block.

In another aspect, relocating the driver is performed in response to determining that the driver of the candidate net is located in a first die of the plurality of dies, all loads of the candidate net are located in a second die of the plurality of dies, and an input slack of the driver is less timing critical than an output slack of the driver.

In another aspect, modifying the candidate net includes replicating the driver of the candidate net to a site in a transmitter channel circuit block or to a site in a receiver channel circuit block.

In another aspect, replicating the driver is performed in response to determining that the driver and the load of the candidate net are located in a first die of the plurality of dies, a further load of the candidate net is located in a second die of the plurality of dies, and an input slack of the driver is less timing critical than an output slack of the driver.

In another aspect, modifying the candidate net includes relocating the load of the candidate net to a site in a receiver channel circuit block or to a site in a transmitter channel circuit block.

In another aspect, relocating the load is performed in response to determining that the load is located in a different die of the plurality of dies than the driver of the candidate net and that an input slack of the load is more timing critical than an output slack of the load.

In another aspect, modifying the candidate net includes creating bins of loads of the candidate net based, at least in part, upon the die of the plurality of dies in which each load is located and replicating the driver of the candidate net to the bins.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method for physical synthesis for a circuit design, the method comprising:
   determining, using a processor, a candidate net from a circuit design, wherein the candidate net spans a plurality of dies of a multi-die integrated circuit;
   modifying, using the processor, the candidate net by relocating a driver or a load of the candidate net or replicating the driver of the candidate net, thereby resulting in a modified candidate net;
   performing an incremental routing, using the processor, on the modified candidate net; and
   selectively committing, using the processor, the modified candidate net based upon a timing analysis of the modified candidate net.

2. The method of claim 1, wherein the circuit design is placed.

3. The method of claim 1, wherein the modifying the candidate net comprises:
   relocating the driver of the candidate net to a site in a transmitter channel circuit block or to a site in a receiver channel circuit block;
   wherein a signal of the candidate net must exit through the transmitter channel circuit block located in a first die of the plurality of dies to pass to a second die of the plurality of dies, the transmitter channel circuit block having a bypassable flip-flop at the site therein; and
   wherein the signal of the candidate net must enter the second die from the first die through the receiver channel circuit block located in the second die, the receiver channel circuit block having a bypassable flip-flop at the site therein.

4. The method of claim 3, wherein the relocating the driver is performed in response to determining that the driver of the candidate net is located in the first die, all loads of the candidate net are located in the second die, and an input slack of the driver is less timing critical than an output slack of the driver.

5. The method of claim 1, wherein the modifying the candidate net comprises:
   replicating the driver of the candidate net to a site in a transmitter channel circuit block or to a site in a receiver channel circuit block;
   wherein a signal of the candidate net must exit through the transmitter channel circuit block located in a first die of the plurality of dies to pass to a second die of the plurality of dies, the transmitter channel circuit block having a bypassable flip-flop at the site therein; and
   wherein the signal of the candidate net must enter the second die from the first die through the receiver channel circuit block located in the second die, the receiver channel circuit block having a bypassable flip-flop at the site therein.

6. The method of claim 5, wherein the replicating the driver is performed in response to determining that the driver and the load of the candidate net are located in the first die, a further load of the candidate net is located in the second die, and an input slack of the driver is less timing critical than an output slack of the driver.

7. The method of claim 1, wherein the modifying the candidate net comprises:
   relocating the load of the candidate net to a site in a receiver channel circuit block or to a site in a transmitter channel circuit block;
   wherein a signal of the candidate net must exit through the transmitter channel circuit block located in a first die of the plurality of dies to pass to a second die of the plurality of dies, the transmitter channel circuit block having a bypassable flip-flop at the site therein; and
   wherein the signal of the candidate net must enter the second die from the first die through the receiver channel circuit block located in the second die, the receiver channel circuit block having a bypassable flip-flop at the site therein.

8. The method of claim 7, wherein the relocating the load is performed in response to determining that the load is located in a different die of the plurality of dies than the driver of the candidate net and that an input slack of the load is more timing critical than an output slack of the load.

9. The method of claim 1, wherein the candidate net has a plurality of loads, and wherein the modifying the candidate net comprises:
   creating bins of the plurality of loads of the candidate net based, at least in part, upon each die of the plurality of dies in which one or more of the plurality of loads is located; and
   replicating the driver of the candidate net to the bins.

10. A system for physical synthesis for a circuit design, the system comprising:
    a processor configured to initiate operations including:
    determining a candidate net from a circuit design, wherein the candidate net spans a plurality of dies of a multi-die integrated circuit;

modifying the candidate net by relocating a driver or a load of the candidate net or replicating the driver of the candidate net, thereby resulting in a modified candidate net;

performing an incremental routing on the modified candidate net; and selectively committing the modified candidate net based upon a timing analysis of the modified candidate net.

11. The system of claim 10, wherein the circuit design is placed.

12. The system of claim 10, wherein the modifying the candidate net comprises:

relocating the driver of the candidate net to a site in a transmitter channel circuit block or to a site in a receiver channel circuit block;

wherein a signal of the candidate net must exit through the transmitter channel circuit block located in a first die of the plurality of dies to pass to a second die of the plurality of dies, the transmitter channel circuit block having a bypassable flip-flop at the site therein; and wherein the signal of the candidate net must enter the second die from the first die through the receiver channel circuit block located in the second die, the receiver channel circuit block having a bypassable flip-flop at the site therein.

13. The system of claim 12, wherein the relocating the driver is performed in response to determining that the driver of the candidate net is located in the first die, all loads of the candidate net are located in the second die, and an input slack of the driver is less timing critical than an output slack of the driver.

14. The system of claim 10, wherein the modifying the candidate net comprises:

replicating the driver of the candidate net to a site in a transmitter channel circuit block or to a site in a receiver channel circuit block;

wherein a signal of the candidate net must exit through the transmitter channel circuit block located in a first die of the plurality of dies to pass to a second die of the plurality of dies, the transmitter channel circuit block having a bypassable flip-flop at the site therein; and wherein the signal of the candidate net must enter the second die from the first die through the receiver channel circuit block located in the second die, the receiver channel circuit block having a bypassable flip-flop at the site therein.

15. The system of claim 14, wherein the replicating the driver is performed in response to determining that the driver and the load of the candidate net are located in the first die, a further load of the candidate net is located in the second die, and an input slack of the driver is less timing critical than an output slack of the driver.

16. The system of claim 10, wherein the modifying the candidate net comprises:

relocating the load of the candidate net to a site in a receiver channel circuit block or to a site in a transmitter channel circuit block;

wherein a signal of the candidate net must exit through the transmitter channel circuit block located in a first die of the plurality of dies to pass to a second die of the plurality of dies, the transmitter channel circuit block having a bypassable flip-flop at the site therein; and wherein the signal of the candidate net must enter the second die from the first die through the receiver channel circuit block located in the second die, the receiver channel circuit block having a bypassable flip-flop at the site therein.

17. The system of claim 16, wherein the relocating the load is performed in response to determining that the load is located in a different die of the plurality of dies than the driver of the candidate net and that an input slack of the load is more timing critical than an output slack of the load.

18. The system of claim 10, wherein the candidate net has a plurality of loads, and wherein the modifying the candidate net comprises:

creating bins of the plurality of loads of the candidate net based, at least in part, upon each die of the plurality of dies in which one or more of the plurality of loads is located; and replicating the driver of the candidate net to the bins.

19. A computer program product comprising a non-transitory computer readable storage medium having program code stored thereon, the program code executable by a processor to perform operations for physical synthesis for a circuit design, the operations comprising:

determining a candidate net from a circuit design, wherein the candidate net spans a plurality of dies of a multi-die integrated circuit;

modifying the candidate net by relocating a driver or a load of the candidate net or replicating the driver of the candidate net, thereby resulting in a modified candidate net;

performing an incremental routing on the modified candidate net; and selectively committing the modified candidate net based upon a timing analysis of the modified candidate net.

20. The computer program product of claim 19, wherein the candidate net has a plurality of loads, and wherein the modifying the candidate net comprises:

relocating the driver of the candidate net to a site in a transmitter channel circuit block or to a site in a receiver channel circuit block;

replicating the driver of the candidate net to a site in a transmitter channel circuit block or to a site in a receiver channel circuit block;

relocating the load of the candidate net to a site in a receiver channel circuit block or to a site in a transmitter channel circuit block; or creating bins of the plurality of loads of the candidate net based, at least in part, upon each die of the plurality of dies in which one or more of the plurality of loads is located and replicating the driver of the candidate net to the bins.

* * * * *